April 29, 1952 — A. B. NIETFELD — 2,594,674
MOTOR MOUNTING
Filed May 2, 1947 — 2 SHEETS—SHEET 1

Inventor
ALBERT B. NIETFELD

By Randolph & Beavers
Attorneys

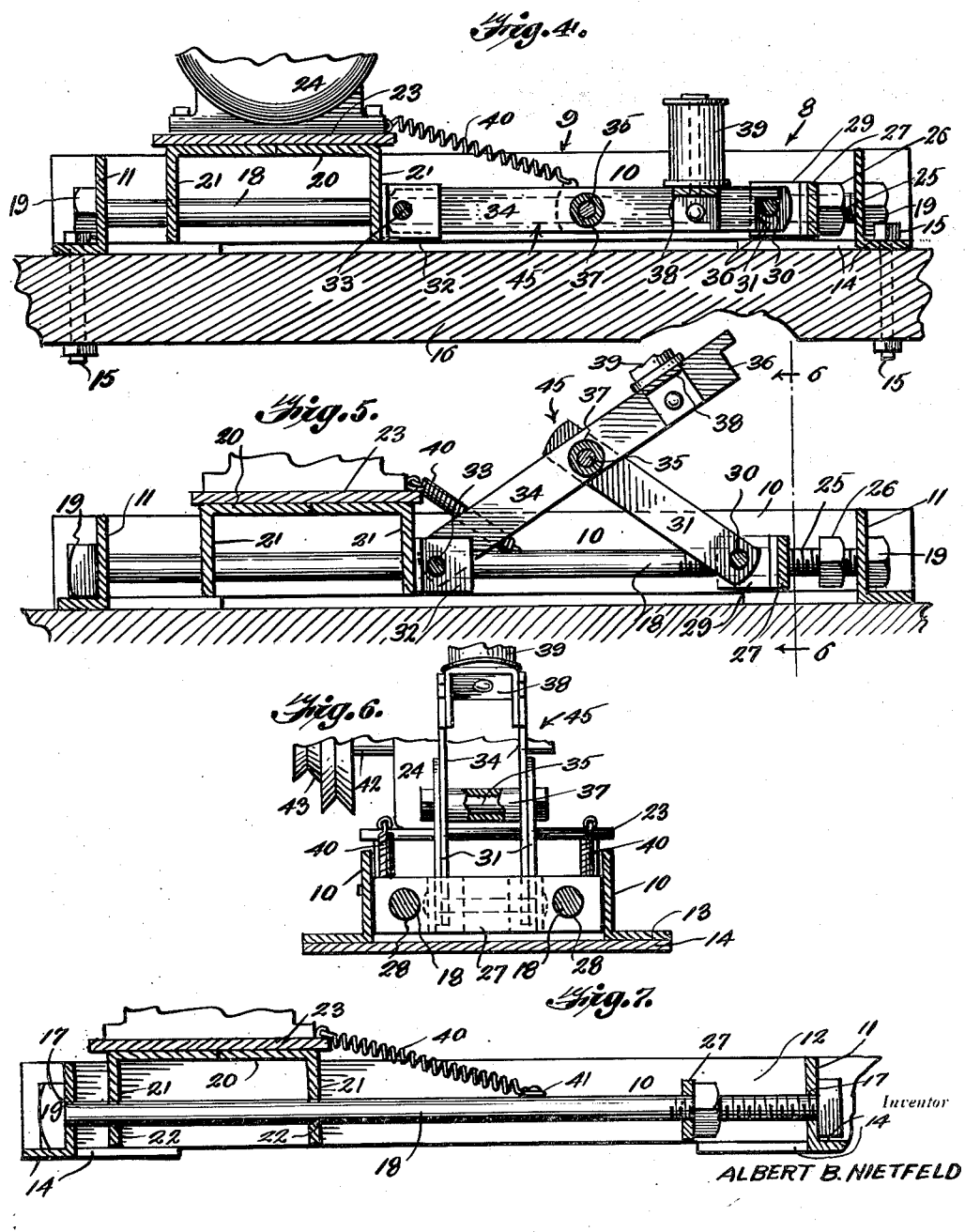

Patented Apr. 29, 1952

2,594,674

UNITED STATES PATENT OFFICE 2,594,674

MOTOR MOUNTING

Albert B. Nietfeld, Fort Laramie, Wyo.

Application May 2, 1947, Serial No. 745,503

2 Claims. (Cl. 248—23)

This invention relates to a readily adjustable mounting especially adapted for electric motors and particularly intended for use to afford a quick release means for a V-belt thereof to facilitate the changing of V-belts on variable speed pulleys, and which is also well adapted for use as a clutch for small stationary internal combustion engines for the purpose of moving such engines into and out of operative relationship to apparatus driven thereby.

Still another object of the invention is to provide a motor mounting capable of being mounted fixedly on a bench or other substantially horizontal supporting surface or which may be secured in a vertical plane to accommodate a motor supported thereby in use with a post drill or the like.

Still a further object of the invention is to provide a mounting having adjustable means for tensioning a belt connected thereto and which is constructed and arranged whereby the motor may be moved to or from a belt releasing position and when returned to an operative, belt engaging position, the same tension will be exerted on the belt.

Still another object of the invention is to provide a motor mounting having means for automatically moving the motor to an inoperative position when a latch means thereof is released.

Various other objects and advantages of the invention will hereinafter become more fully apparent from the following description of the drawings, illustrating a preferred embodiment thereof, and wherein:

Figure 4 is a longitudinal, substantially central sectional view of the motor mounting, shown in an operative position;

Figure 5 is a similar view showing the motor mounting in an inoperative position;

Figure 6 is a cross sectional view of the motor mounting taken substantially along a plane as indicated by the line 6—6 of Figure 5, and Figure 7 is a longitudinal, vertical sectional view taken substantially along a plane as indicated by the line 7—7 of Figure 2, but showing the mounting adjusted for tensioning the belt pulley.

Figure 1:
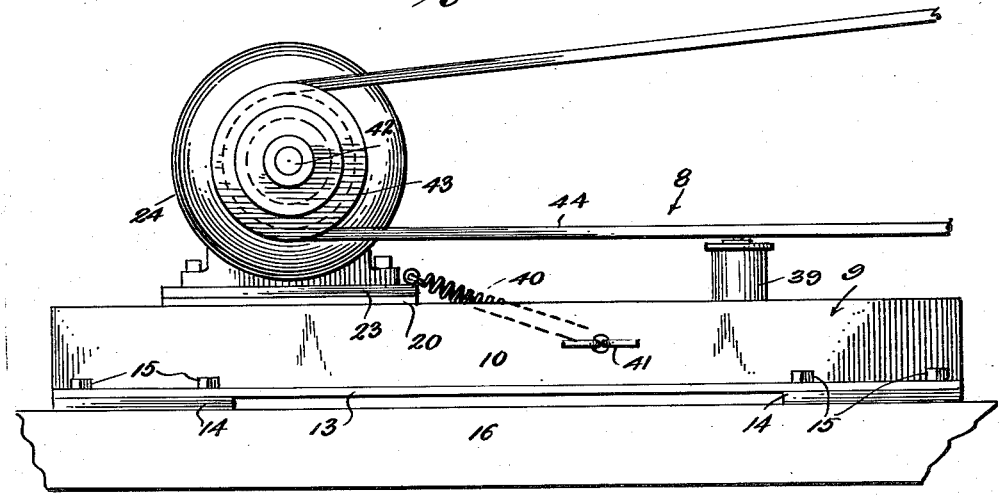
Figure 1 is a side elevational view showing the motor mounting in an operative position.

Referring more specifically to the drawings, 8 designates generally the motor mounting in its entirety and which includes an open frame, designated generally 9, formed of corresponding elongated sides 10 and corresponding ends 11. The sides and ends 10 and 11 are preferably each formed of angle iron and the inner, upstanding sides thereof define the elongated opening 12 of the frame 9. The outwardly extending, horizontally disposed lower flanges 14 of the end members 11 extend beyond the ends of the upstanding vertical flanges thereof and engage under the ends of the horizontal flanges 13 of the side members 10, at the ends thereof, and said end portions of the flanges 14 are laterally elongated in directions lengthwise of the flanges 13 and are positioned therebeneath and secured thereto by fastenings 15 which are anchored to a supporting surface 16, such as a workbench, for fixedly securing the motor mounting 8 thereto. The horizontal flanges 14 of the end members 11 form the base of the mounting 8 and rest upon a bench or other surface 16.

The inner, upstanding flanges of the end members 11, are each provided with a pair of longitudinally spaced openings 17 which are alined for receiving rods 18 which extend longitudinally through the opening 12 of the frame 9 and which are disposed in spaced substantially parallel relationship to one another and to the vertical, inner flanges of the sides 10. The rods 18 are threaded at their ends to receive nuts 19 which bear against the outer sides of the vertical flanges of the ends 11 for retaining the rods 18 in applied position.

A carriage member 20 comprises a plate having downturned ends 21, which are provided with aligned openings 22 for slidably engaging the rods 18, and said ends 21 are disposed within the opening 12 for sliding movement between the side members 10 and with the intermediate, bight portion of the plate 20 extending to above the upper edges of the vertical flanges of the side and end members 10 and 11. A base plate 23 is suitably fastened to the upper side of the horizontal or intermediate portion of the carrier 20 and preferably has its side edges overlying the vertical flanges of the side members 10 and provides a support for the base of a motor 24, such as an electric motor and which is bolted or otherwise fastened thereto.

Figure 2:
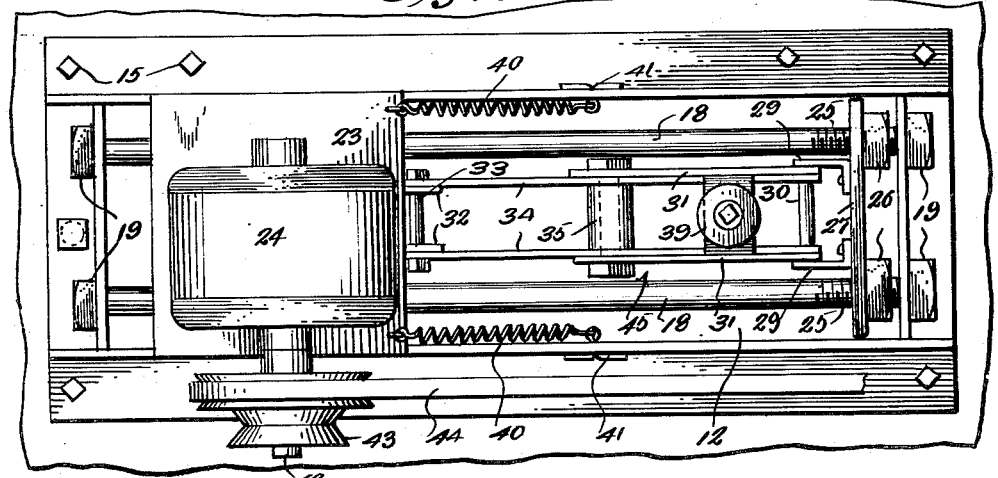
Figure 2 is a top plan view thereof.
Figure 3:
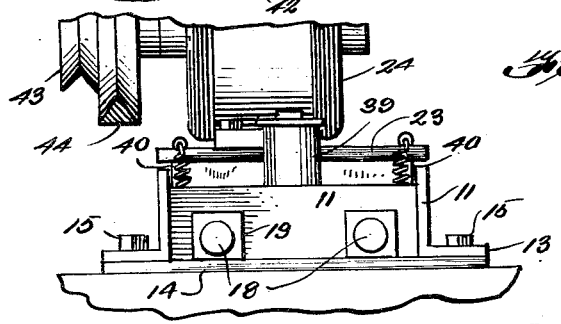
Figure 3 is an end elevational view, looking from right to left of Figures 1 and 2.

As best seen in Figures 1 and 2, the carrier 20 is normally disposed adjacent the outer end of the frame 9 and the rods 18, adjacent the inner end of said frame are threaded as seen at 25 for receiving adjusting nuts 26, which are disposed thereon and within the opening 12 and which function for adjustably positioning an anchor bar 27 longitudinally of the opening 12. The anchor bar 27 is disposed transversely of the opening 12 and is provided with openings 28, as best seen in Figure 6, for slidably engaging the rods 18.

A pair of L-shaped brackets 29 are fastened to the inner side of the bar 27, between the rods 18 and have corresponding ends extending toward the opposite end of the frame 9 and through which a shaft or pin 30 extends. A pair of levers 31 are pivotally mounted at corresponding ends thereof on the pin or shaft 30 and extend longitudinally and inwardly of the frame 9, and a pair of corresponding L-shaped brackets 32 are fastened to the outer side of the inner downturned end 21 of the carrier 20 and extend toward the anchor bar 27 and have a pin or rod 33 extending therethrough and on which a pair of levers 34 are pivotally mounted at corresponding ends thereof. A rod or pin 35 extends through and pivotally engages the levers 34, intermediate of their ends and the levers 31 at the opposite ends thereof to form a toggle-joint. The opposite ends of the levers 34 are disposed between the levers 31, when said toggle-joint is in an extended position, and are provided with downwardly opening notches or recesses 36 at their opposite, free ends, adapted to engage the pin 30 for limiting the downward movement of the toggle-joint from its position of Figure 5, to its position of Figure 4. A spacing sleeve or bushing 37 is preferably disposed on the pin 35 between the intermediate portions of the levers 34 for holding the levers 34 and 31 in promptly spaced relationship. The levers 34 are connected adjacent their free ends by a bar 38 which extends therebetween and which is provided with downturned ends which are fastened to the inner sides of said levers 34 and which bar provides a support for an upstanding handle 39.

A pair of contractile coil springs 40 are anchored at corresponding ends thereof to the plate 23, adjacent the inner edge of said plate and said springs have their opposite ends anchored with cotter pins or similar fastenings 41, which extend through the vertical flanges of the side members 10 and which are disposed intermediate of the ends thereof for urging the carrier 21 toward the intermediate portion of the frame 9.

The electric motor 24 is provided with a driven shaft 42, equipped with a cone or variable speed V-pulley, the annular grooves of which are adapted to be selectively engaged by a V-belt, as seen at 43 and 44, respectively. The belt 44 is adapted to be trained over the pulley of a shaft or other parts to be driven thereby, not shown, and to be tensioned when the toggle-joint, previously described and designated generally 45 is in substantially a straight line and with the intermediate pivot 35 thereof in line with or slightly below the end pivots 30 and 33. To release the tension on the belt 44 to enable said belt to be quickly adjusted to another groove of the pulley 43, the handle 39 is grasped and an upward pull exerted thereon for swinging the free ends of the levers 34 upwardly for causing the toggle-joint to break at its knee 35, as seen in Figure 5. This will permit the spring 40 to contract for drawing the carrier 20 carrying the motor 24 toward the center of the frame 9 or from left to right, thus releasing the tension on the belt 44 so that it can be readily moved to another pulley groove. A downward pressure on the handle 39 will then return the toggle-joint 45 to an extended position and as the adjusting nuts 26 will limit the outward movement of the anchor bar 27, the carrier 20 will be returned to its initial position of Figures 1 and 2.

Likewise, it will be readily apparent that the adjusting nuts 26 may be adjusted longitudinally of the threaded portions 25 for longitudinally adjusting the anchor bar 27 and thereby adjusting the position of the carrier 20, when in an operative position, as seen in Figures 1, 2 and 4, to thereby adjust the tension of the belt 44.

Various modifications and changes are contemplated and may obviously be resorted to, without departing from the spirit and scope of the invention as hereinafter defined by the appended claims.

I claim as my invention:

1. A motor mounting comprising an elongated stationary frame including complementary end walls and complementary side walls, rods disposed in the frame and secured to the end walls, said rods being disposed between the side walls and substantially parallel thereto and to one another, a motor supporting carriage slidably engaging said rods, abutment means slidably mounted on the rods between the carriage and one end wall, a toggle joint extending between the carriage and said abutment means having one end pivoted to the abutment means and its opposite end pivoted to the carriage, stop means connected to the rods between said end wall and the abutment means and limiting sliding movement of the abutment means in a direction away from the carriage, said toggle joint retaining the carriage in a belt tensioning position remote to the abutment means when the toggle joint is extended, the intermediate pivot of the toggle joint being movable upwardly across a straight line joining its end pivots to permit the carriage to slide on the rods toward the abutment means to a belt releasing position and to permit the abutment means to slide on the rods away from the stop means.

2. A motor mounting as in claim 1, and resilient means connected to the frame and carriage and urging the carriage toward said abutment means when the intermediate toggle joint pivot is displaced upwardly.

ALBERT B. NIETFELD.

REFERENCES CITED

The following references are of record in the file of this patent:

UNITED STATES PATENTS

| Number | Name | Date |
| --- | --- | --- |
| 1,328,110 | Wilson | Jan. 13, 1920 |
| 1,482,370 | Spilger | Jan. 29, 1924 |
| 1,632,261 | Woodrow | June 14, 1927 |
| 2,196,891 | Berndt | Apr. 9, 1940 |
| 2,459,373 | Gettys | Jan. 18, 1949 |

FOREIGN PATENTS

| Number | Country | Date |
| --- | --- | --- |
| 153,240 | Great Britain | Nov. 4, 1920 |